(12) United States Patent
Chou (10) Patent No.: US 8,826,171 B2
(45) Date of Patent: Sep. 2, 2014

(54) SYSTEM AND METHOD FOR ENTRY AND DISPLAY OF BLUEPRINT DATA

(75) Inventor: Steve S. K. Chou, Camas, WA (US)

(73) Assignee: Trimble Navigation Limited, Sunnyvale, CA (US)

(*) Notice: Subject to any disclaimer, the term of this patent is extended or adjusted under 35 U.S.C. 154(b) by 1934 days.

(21) Appl. No.: 10/750,261

(22) Filed: Dec. 31, 2003

(65) Prior Publication Data

US 2005/0140677 A1 Jun. 30, 2005

(51) Int. Cl.
*G06F 3/048* (2013.01)

(52) U.S. Cl.
USPC .......................................................... 715/780

(58) Field of Classification Search
CPC  G06F 3/04845; G06F 3/0488; G06F 3/04892
USPC ..................... 715/780; 345/443, 442
See application file for complete search history.

(56) References Cited

U.S. PATENT DOCUMENTS

| | | | | |
|---|---|---|---|---|
| 4,663,616 | A * | 5/1987 | Christensen | 345/681 |
| 4,811,243 | A * | 3/1989 | Racine | 715/863 |
| 5,568,565 | A * | 10/1996 | Minakata | 382/187 |
| 5,579,459 | A * | 11/1996 | Jennyc | 345/627 |
| 5,615,321 | A * | 3/1997 | Corn | 345/643 |
| 5,625,827 | A * | 4/1997 | Krause et al. | 715/502 |
| 6,904,393 | B2 * | 6/2005 | Schwalb et al. | 703/1 |
| 7,013,234 | B1 * | 3/2006 | Olmsted | 702/150 |
| 7,130,774 | B2 * | 10/2006 | Thomas et al. | 703/1 |
| 2001/0018644 | A1 * | 8/2001 | Schwalb et al. | 703/7 |
| 2002/0113784 | A1 * | 8/2002 | Feilmeier et al. | 345/419 |
| 2005/0041028 | A1 * | 2/2005 | Coutts | 345/441 |

FOREIGN PATENT DOCUMENTS

| | | |
|---|---|---|
| WO | WO 01/55831 | 8/2001 |
| WO | WO 02/093403 | 11/2002 |

OTHER PUBLICATIONS

Sharchive Website, Dec. 14, 2003☐☐http://web.archive.org/web/20030811204907/sharechive.com/facs.html.*
Arc Second, Inc., "PocketCAD Extreme Mobility", User Guide PocketCAD Pro Version 4.0, May 2001 pp. 1-124.*
Microsoft Office Word, Published Nov. 2003, Screenshots Figures 1-3.*
David Kurlander, Editable Graphical Histories, 1988, Department of Computer Science Columbia University.*
Patent Abstracts of Japan vol. 1995, No. 11, Dec. 26, 1995 &JP 07 230482 A (Sekisui Chem Co Ltd), Aug. 29, 1995 abstract.
Patent Abstracts of Japan vol. 1997, No. 01, Jan. 31, 1997 & JP 08 227461 A (Kuwabara Keiichi), Sep. 3, 1996 abstract.
Patent Abstracts of Japan vol. 1996, No. 01, Jan. 31, 1996 &JP 07 234892 A (Takenaka Komuten Co Ltd), Sep. 5, 1995 abstract.

* cited by examiner

*Primary Examiner* — William Bashore
*Assistant Examiner* — Henry Orr (57) ABSTRACT

A handheld device with a graphical user interface (GUI) for entering and displaying blueprint data as a hierarchical sequence of segments. A handheld device having a touch-screen and/or keys is used to sequentially enter line segments and arcs to enter blueprint data into the device. Each line segment or arc that is entered may be referenced to an existing endpoint or start point of a previously entered line segment or arc. A blueprint entered into the handheld device may be edited by modifying, deleting, or inserting a line segment or arc. When an edit is performed, the line segments and arcs in the sequence that follow the element being edited may be automatically modified to maintain continuity in the blueprint without disturbing prior segments in the sequence.

6 Claims, 7 Drawing Sheets

| Fro... | To... | Direction | Horz... |
|---|---|---|---|
| 1 | 2 | 0°00'00" | 18.0... |
| 2 | 3 | 0°00'00" | 18.0... |
| 3 | 4 | 0°00'00" | 18.0... |
| 4 | 5 | 90°00'00" | 20.0... |
| 5 | 6 | 0°00'00" | 15.0... |
| 6 | 7 | 90°00'00" | 15.0... |
| 7 | 8 | 90°00'00" | 15.0... |
| 8 | 9 | 180°00'00" | 15.0 |
| 9 | 10 | 180°00'00" | 15.0... |
| 10 | 11 | 90°00'00" | 15.0... |
| 11 | 12 | 180°00'00" | 20.0... |
| | | | 18.0... |

FIG. 4C

Enter Line

Line Start Pt: 1
Horz Dist: 25.0 ft
Direction: 270.00.00
Repeat: 1

30 Feet

SYSTEM AND METHOD FOR ENTRY AND DISPLAY OF BLUEPRINT DATA

FIELD OF THE INVENTION

The present claimed invention relates to the field of portable electronic instruments More particularly, the present claimed invention relates to a method for blueprint data entry and display using a handheld device.

BACKGROUND ART

Blueprints have long been used to provide information for use at a construction site. Prior to the advent of portable electronic calculators and instruments, the use of the blueprint information in the field typically involved hand calculations and reference tables, and the information was only available as hard copy on a job site.

The adoption of handheld calculators and electronic surveying instruments has provided an electronic storage medium for information that has augmented the traditional blueprint. In using a combination of electronic and hard copy information sources, there is frequently a requirement for transferring information from one medium to the other.

The transfer of electronic information to hard copy can be achieved by simply formatting and printing out the information stored in the electronic medium. This process requires minimal effort on the part of a human user. However, the transfer of information in blueprint to an electronic instrument requires more effort, particularly if the electronic instrument is a handheld device. The size of a handheld device generally limits the input/output (I/O) capability of the device.

The overhead involved in data entry for a handheld device may be increased significantly when corrections or edits must be made. For example, a blueprint entered as a series of line segments may require many line segments in the series to be re-entered or corrected if an early line segment in the series was incorrect and subsequent entries were made relative to the incorrect entry.

Thus a need exists for a system and method that provides efficient transfer of blueprint information to a device having a limited I/O capability, such as a handheld device. There is also a need for a device that provides for efficient editing and correction of data entry.

SUMMARY OF INVENTION

Accordingly, the present invention provides a system and method for efficiently entering blueprint data into a handheld device. Efficient correction and editing of entered blueprint data is also provided.

In an embodiment of the invention, a handheld device comprising a touchscreen and/or keys is used to sequentially enter line segments and arcs to enter blueprint data into the device. Each line segment or arc that is entered may be referenced to an existing endpoint or start point of a previously entered line segment or arc. A single line segment may be repeated without re-entering its parameters. Similarly, an arc may be subdivided into multiple arcs of uniform length without entering parameters for each arc segment.

In a further embodiment of the invention, a blueprint entered into the handheld device may be edited by modifying, deleting, or inserting a line segment or arc. When an edit is performed, the line segments and arcs in the sequence that follow the element being edited may be automatically modified to maintain continuity in the blueprint.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances well known methods, procedures, user interfaces, and drafting conventions have not been described in detail as not to unnecessarily obscure aspects of the present invention.

Figure 1:
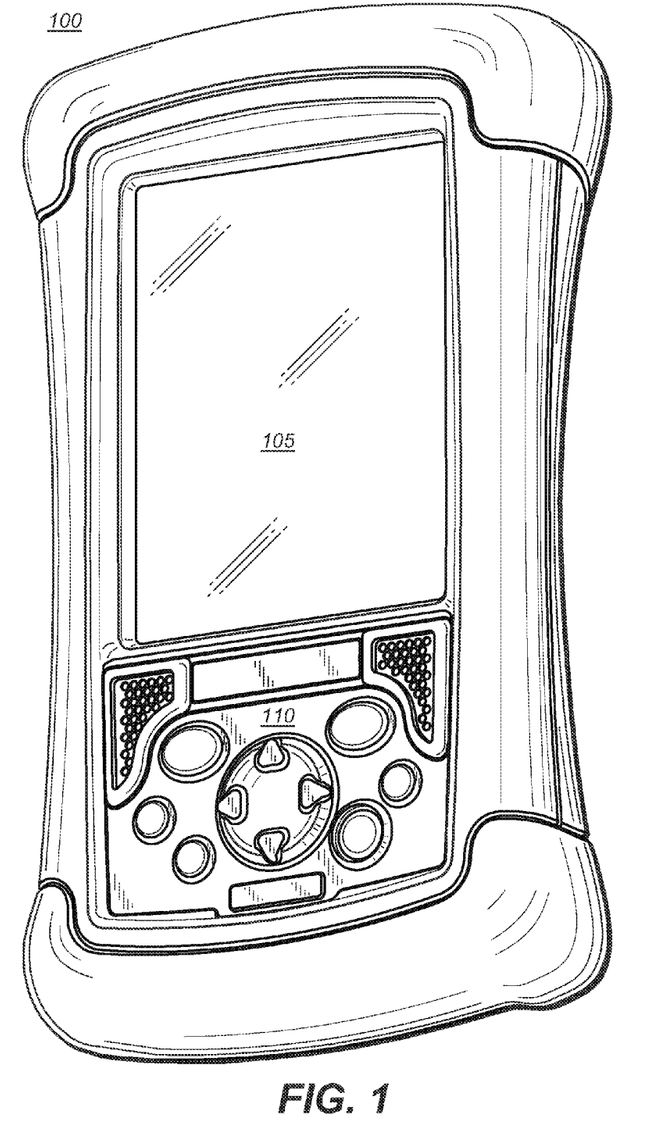
FIG. 1 shows an example of a handheld device that may be used for blueprint data entry in accordance with an embodiment of the present claimed invention.

FIG. 1 shows an example of a handheld device 100 that may be used for blueprint data entry in accordance with an embodiment of the present claimed invention. The handheld device 100 includes a display 105 and a keypad 110.

The display 105 is used to display text and graphics images for a user. The display 105 may provide icons or menus that may be selected by using the keypad 110. Alternatively, the display 105 may be a touchscreen that allows a user to perform data entry and other operations without requiring the keypad 110. The keypad 110 may be used for display control and the selection and execution of functions represent on the display 105.

The handheld device 100 includes a data processor and memory for accepting, storing, displaying, and editing entered blueprint data. A blueprint plan is entered as a sequence of line segments and/or arcs. The position of arcs and segments in the sequence may be used to determine the action taken with respect to the unedited arcs or line segments when a selected arc or line segment is edited, inserted, or deleted. In one embodiment, handheld device 100 includes a computer-readable medium, such as the above described memory, comprising computer-executable instruction (e.g., executed by the above described processor) stored therein for causing performance of procedures described herein.

Figure 2A:
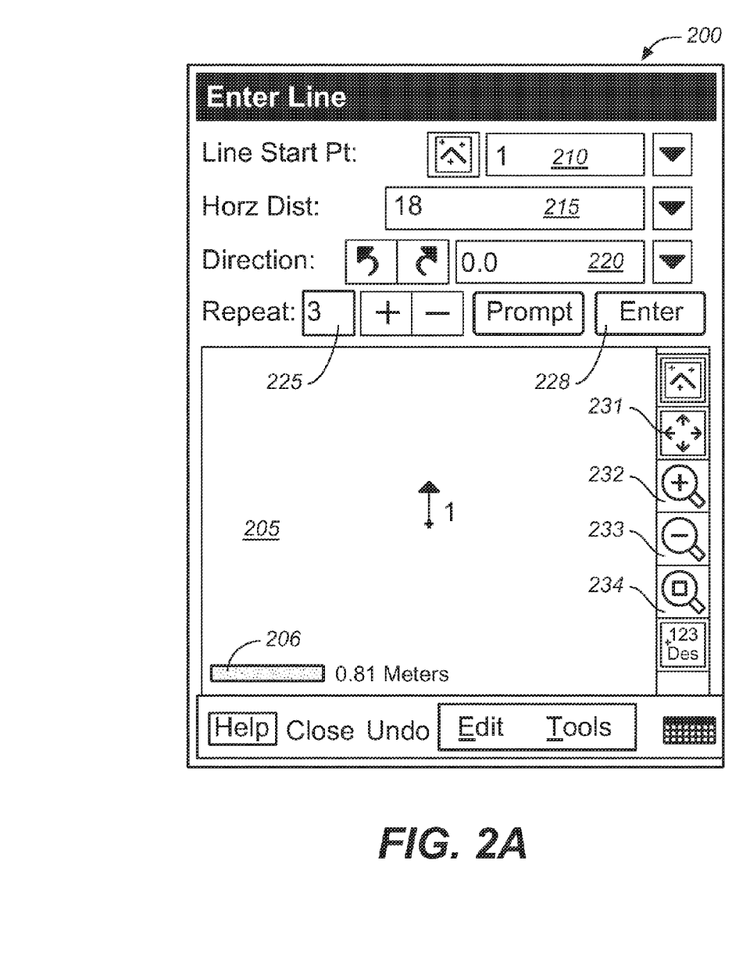
FIG. 2A shows an initial line segment entry display in accordance with an embodiment of the present claimed invention.

FIG. 2A shows an example of graphical user interface (GUI) that may be displayed on the display 105. In the discussion that follows, reference will be made to the entry of data into GUI fields and to the selection and execution of functions associated with visual objects presented on the GUI 200. It is appreciated that direct selection with a stylus on the GUI 200 and/or selection of a field or icon on the GUI 200 through keystrokes may be used. A stylus on a touchscreen or keystrokes may also be used in conjunction with an intermediate transient display such as a soft keyboard, in order to perform data entry for a GUI field.

A data display area 205 is shown with an initial start point 1 and a scale bar 206. GUI 200 includes a line start point field 210, a horizontal distance field 215, a direction field 220 and a repeat field 225. In entering a line segment, a user enters a start point, a length, a direction, and a repeat factor in the appropriate fields. After engineering the line segment parameters the line segment may be entered by using the enter button 228.

In the example of FIG. 2A, the start point for a first line segment is shown with a default value of 1. A length of 18 m, a direction of 0.0 degrees, and a repeat factor of 3 are shown entered in fields 210, 215, and 220, respectively. A dropdown menu indicated by an arrow on the right of fields 210, 215, and 220 may be used to select values from a list.

Figure 2B:
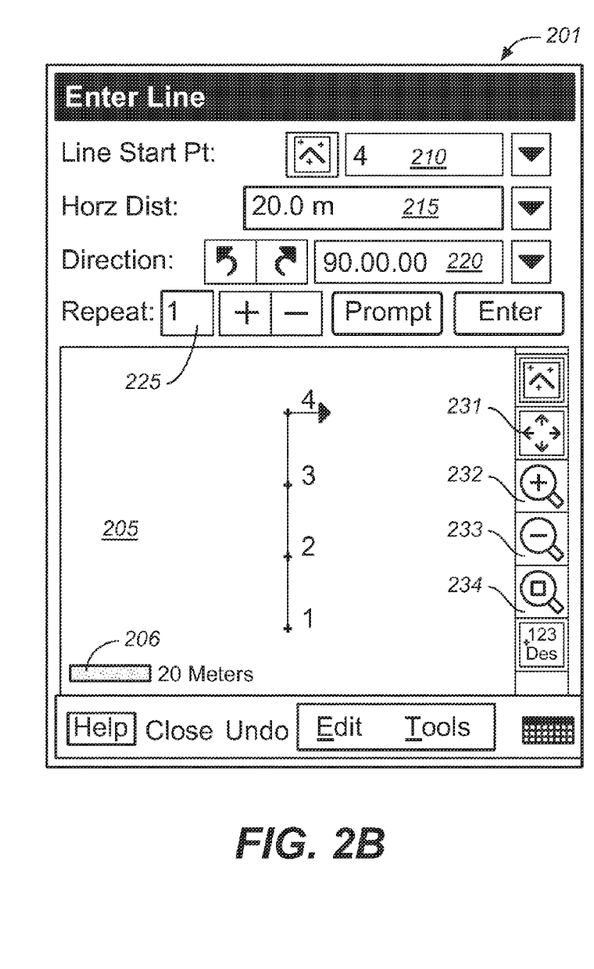
FIG. 2B shows a partially completed blueprint data entry in accordance with an embodiment of the present claimed invention.

FIG. 2B shows a GUI 201 that is displayed in response to the data entry associated with FIG. 2A, and an additional line segment entry. The line segment entry of FIG. 2A produces three sequential line segments, with the start point of each succeeding line segment being the end point of the previous line segment. In general, a start point of a new line segment may be selected from existing start points or end points. A start point may be entered by tapping a touchscreen display, selecting from a dropdown menu, or by manual entry (e.g., soft keyboard). The start point of a new segment may set to default to the end point of the last placed segment.

In addition to the previously entered data, The GUI 201 also shows another line segment with a start point 4, length 20.0 m, and direction 90.00.00 degrees, and a repeat factor of 1. As shown by the scale bar 206, the displayed entered data has been scaled in order to fit the display area 205.

The GUI 201 shows display control icons 231, 232, 233, and 234. Icon 231 may be used to zoom out in order to display the whole plan. Icon 232 may be used to zoom in on a selected point or the center of the display. Icon 233 may be used to zoom out from a selected point or the center of the display. Icon 234 may be used to zoom to a selected area.

Figure 2C:
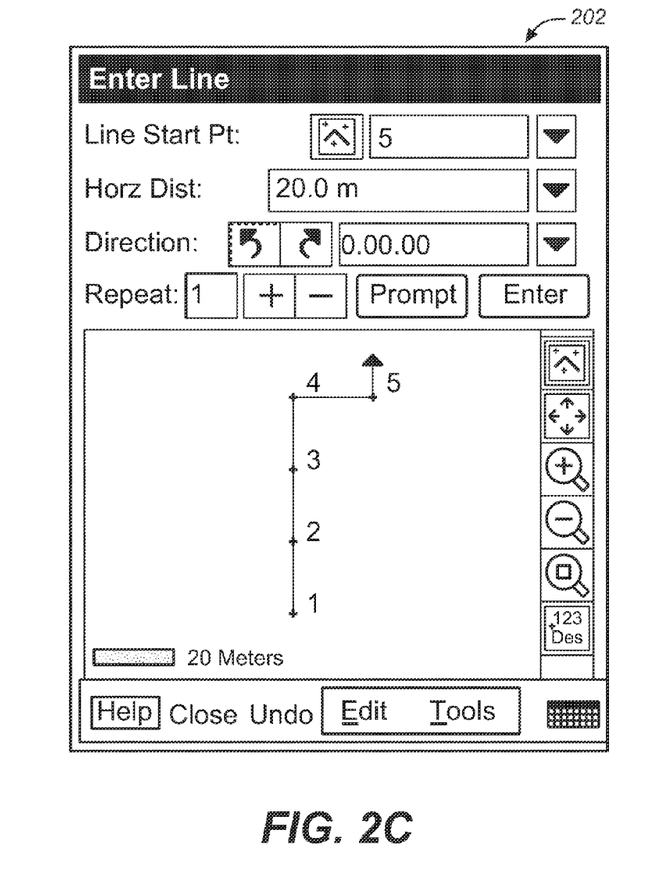
FIG. 2C shows a continued blueprint data entry in accordance with an embodiment of the present claimed invention.

FIG. 2C shows a GUI 202 that is a continuation of the plan entry of FIG. 2B. The GUI 202 shows another line segment being entered with a start point 5, length 20.0 m, and direction 0.00.00 degrees, and a repeat factor of 1.

Figure 2D:
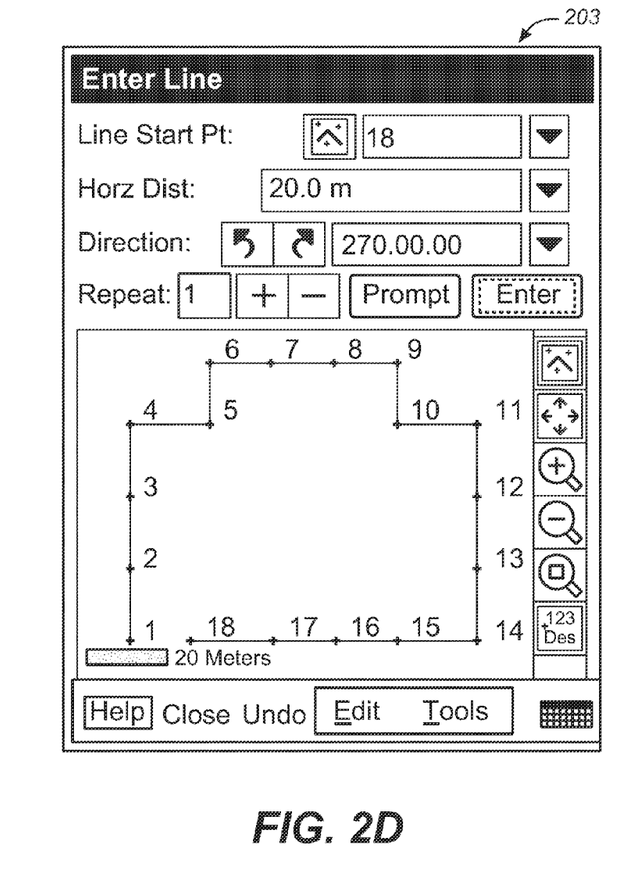
FIG. 2D shows a nearly complete blueprint data entry in accordance with an embodiment of the present claimed invention.

FIG. 2D shows a GUI 203 that is associated with a nearly completed plan entry. In this example, a data entry error exists due to the failure of point 18 to coincide with point 1 and close the plan. In a method embodiment of the present invention, the entered plan may be edited and corrected by editing a single line segment.

Figure 3A:
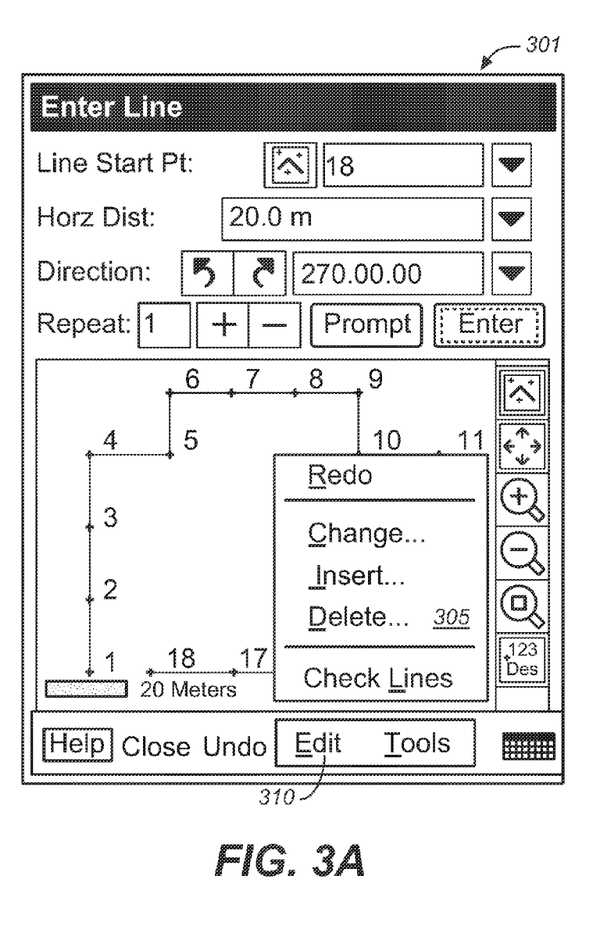
FIG. 3A shows an edit menu display in accordance with an embodiment of the present claimed invention.

FIG. 3A shows a GUI 301 that includes a menu 305 that is displayed by activating menu button 310. The menu provides for changing, inserting, and deleting a single line segment from the entered plan data. Within the handheld device the plan may be stored as a hierarchical sequence of segments. When a particular segment within the sequence is edited, the segments following the edited segment may also be affected.

Figure 3B:
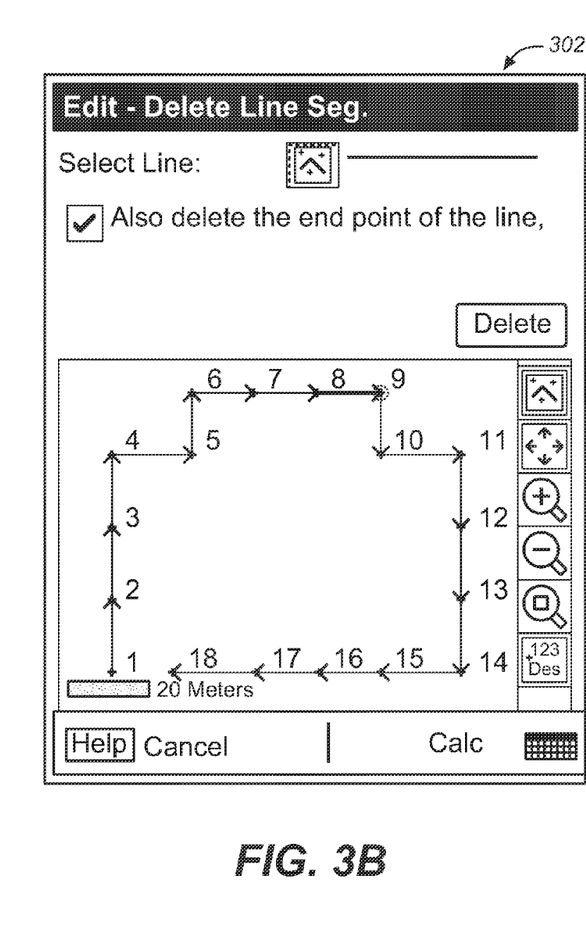
FIG. 3B shows an edit selection in accordance with an embodiment of the present claimed invention.

FIG. 3B shows a GUI 302 with the line segment between points 8 and 9 selected for deletion. In selecting a line for deletion, the end point of the line may optionally be deleted. In the example of FIG. 3B end point deletion is selected. This will result in a modification of the line segments subsequent to the selected line segment.

Figure 3C:
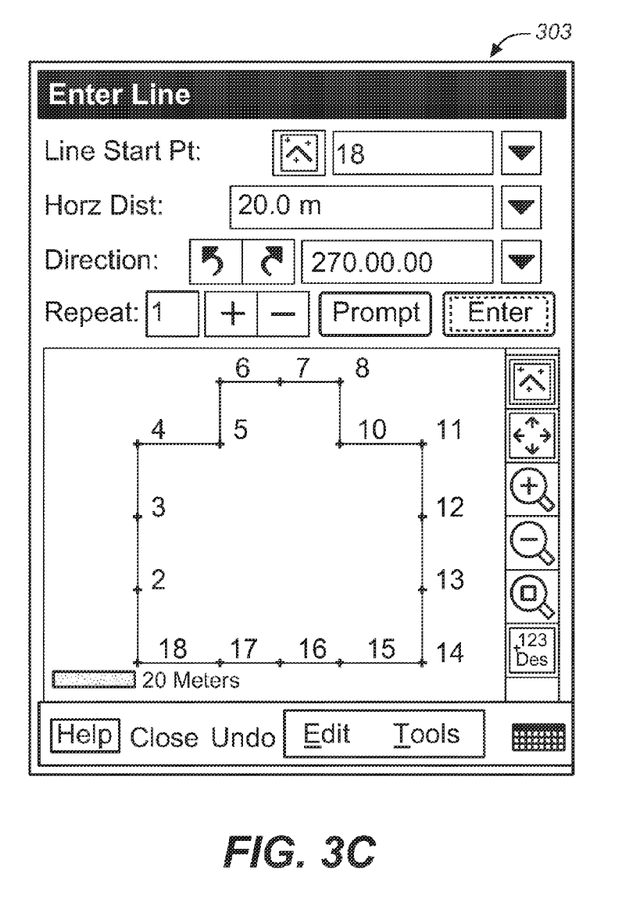
FIG. 3C shows a completed edit with automatic segment modification in accordance with an embodiment of the present claimed invention.

FIG. 3C shows a GUI 303 with the selected line and end point 9 of FIG. 3B deleted. The line segments subsequent to the selected line segment have been identically translated to achieve coincidence between start point of the next segment in the sequence and the end point of the segment prior to the deleted segment.

The deletion of a line segment and its endpoint results in a hierarchical translation of line segments. The segments that precede a segment selected for edit in sequence are unaffected, whereas segments that follow the selected segment are translated. Similar to deleting a line segment, a start point may be selected for insertion of a line segment between existing segments. For example, insertion of a line segment could undo the effect of the previously described deletion by insertion of a line segment with a start point at point 7. The insertion of a line segment into the hierarchical sequence of line segments may thus shift succeeding line segments while leaving preceding line segments undisturbed.

Figure 4A:
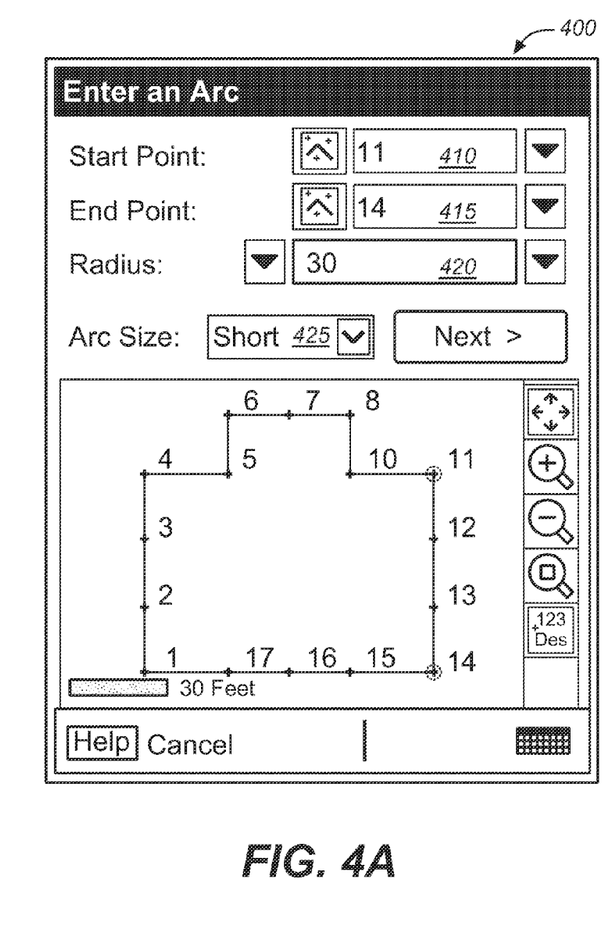
FIG. 4A shows a partial blueprint data entry including an arc in accordance with an embodiment of the present claimed invention.

FIG. 4A shows a GUI 400 for arc data entry. The GUI 400 for arc entry includes start point field 410, an and point field 415, a radius field 420, and an arc size field 425. In this example, the start point is point 11 and the end point is point 14. The radius of the arc is 30.0 ft and the arc size is short. Arc size may be designated as short (e.g., less than or equal to 180 degrees) or long (e.g., greater than 180 degrees).

Figure 4B:
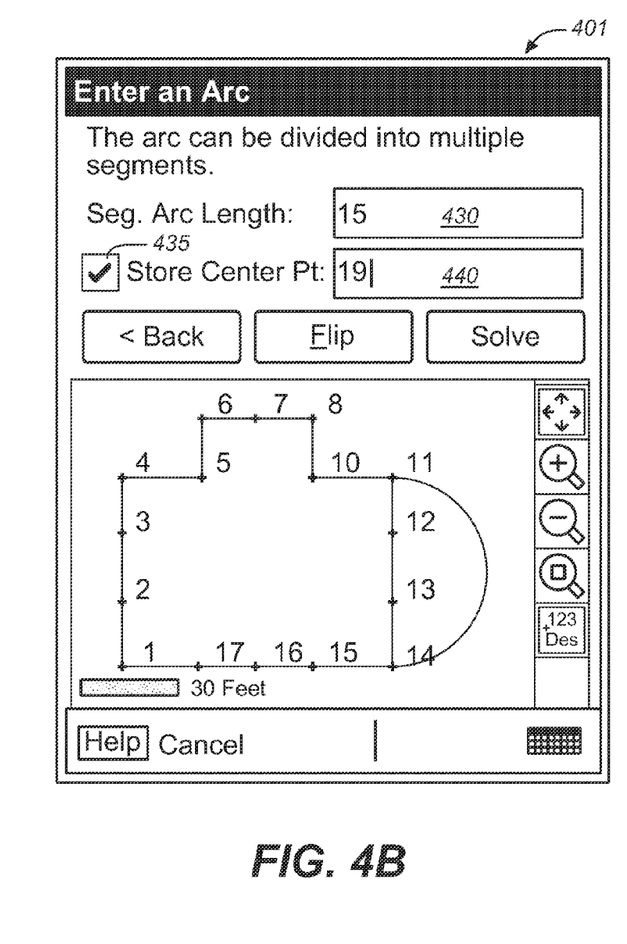
FIG. 4B shows a graphical user interface with data input fields for arc subdivision in accordance with an embodiment of the present claimed invention.

FIG. 4B shows a GUI 401 with data input fields for arc subdivision. A segment arc length field 430 is provided for entry of a subdivision length. A store center point check box 435 and center point display field 440 is also provided. When the box 435 is checked, the center point is automatically generated. In this example, the segment arc length is 15 ft and the center point identification is point 19.

Figure 4C:
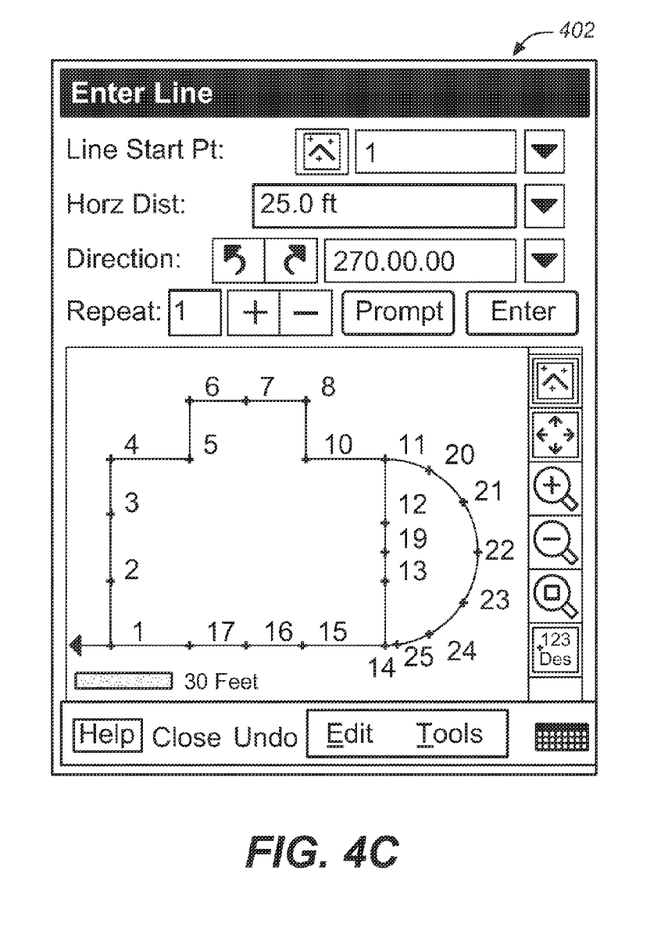
FIG. 4C shows the graphical user interface of FIG. 4B with an arc subdivided in accordance with an embodiment of the present claimed invention.

FIG. 4C shows GUI a 402 that displays the results of the execution of the arc subdivision parameters shown in FIG. 4B. The arc between point 11 and point 14 has been subdivided into segments having a maximum length of 15 ft. Also, the center point 19 has been added to the plan.

Figure 5:
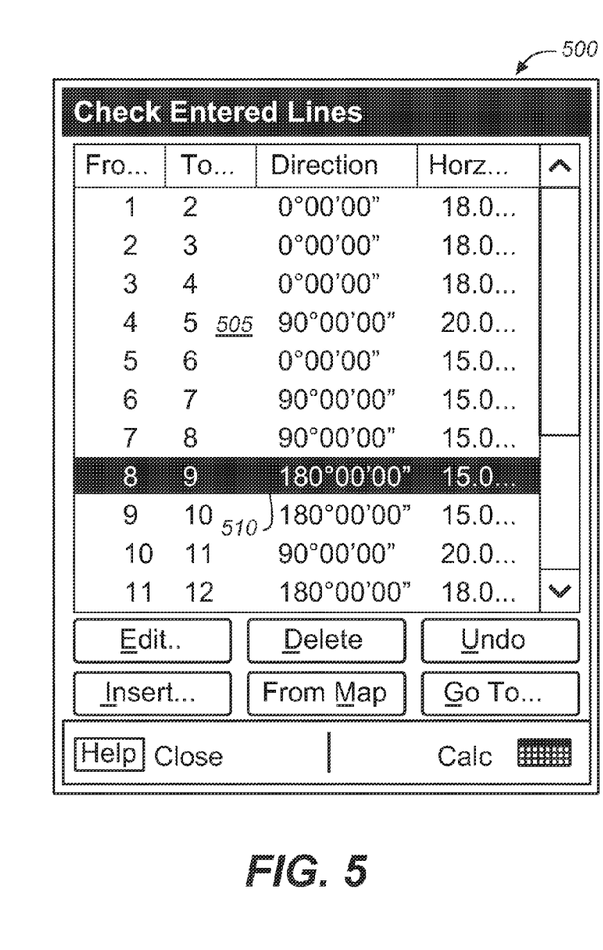
FIG. 5 shows a display for text-based editing of line segments in accordance with an embodiment of the present claimed invention.

FIG. 5 shows a GUI 500 for text-based editing of line segments. The display area 505 includes a list of line segments. For example, the highlighted segment 510 has a start point 8, end point 9, direction 90.00.00, and length 15. Lines may be edited (by editing parameters), inserted and deleted using the GUI 500.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A method for entering blueprint data into a handheld device comprising:
   receiving in said handheld device a start point for a first line segment;
   receiving in said handheld device a length for said first line segment;
   receiving in said handheld device a direction for said first line segment, wherein an end point of said first line segment is determined from said start point, said direction, and length received for said first line segment;
   receiving in said handheld device a start point for an arc;
   receiving in said handheld device an end point for said arc;
   receiving in said handheld device a radius for said arc;
   receiving and displaying said first line segment and said arc on a display associated with said handheld device;
   automatically parsing said arc into a plurality of arc subdivisions with a line segment editor;
   receiving in said handheld device a start point for a second line segment, wherein said start point of said second line segment is said end point of said first line segment wherein said end point of said second line segment is determined from said start point of said second line segment, and received direction and length for said second line segment;
   receiving and displaying said second line segment on said display;
   receiving in said handheld device a start point for a third line segment, wherein said start point of said third line segment is said end point of said second line segment;
   translating in said handheld device said second line segment so that the start point of said second line segment coincides with an end point of said third line segment;
   receiving and displaying said third line segment on said display;
   storing said first, second, and third line segments as a hierarchical sequence within a memory of said handheld device; and
   in response to deletion of said second line segment a processor of said handheld device automatically identically translates said third line segment in said memory without translating said first line segment such that coincidence is achieved between the start point of said third line segment and an endpoint of said first line segment.

2. The method of claim 1, further comprising receiving a repeat factor for said first line segment.

3. A computer system for entering blueprint data into a handheld device comprising:
   a graphical user interface for receiving in said handheld device a start point for a first line segment;
   said graphical user interface for receiving in said handheld device a length for said first line segment;
   said graphical user interface for receiving in said handheld device a direction for said first line segment, wherein an end point of said first line segment is determined from said start point, said direction, and length received for said first line segment;
   said graphical user interface for receiving in said handheld device a start point for an arc;
   said graphical user interface for receiving in said handheld device an end point for said arc;
   said graphical user interface for receiving in said handheld device a radius for said arc;
   said graphical user interface for receiving and displaying said first line segment and said arc on a display associated with said handheld device;
   a processor for automatically parsing said arc into a plurality of arc subdivisions with a line segment editor;
   said graphical user interface for receiving in said handheld device a start point for a second line segment, wherein said start point of said second line segment is said end point of said first line segment wherein said end point of said second line segment is determined from said start point of said second line segment, and received direction and length for said second line segment;
   said graphical user interface for receiving and displaying said second line segment on said display;
   said graphical user interface for receiving in said handheld device a start point for a third line segment, wherein said start point of said third line segment is said end point of said second line segment;
   said processor for translating in said handheld device said second line segment so that the start point of said second line segment coincides with an end point of said third line segment;
   said graphical user interface receiving and displaying said third line segment on said display;
   a memory for storing said first, second, and third line segments as a hierarchical sequence within said handheld device; and
   said processor, in response to deletion of said second line segment a processor of said handheld device automatically identically translates said third line segment in said memory without translating said first line segment such that coincidence is achieved between the start point of said third line segment and an endpoint of said first line segment.

4. The computer system of claim 3, wherein said display is a touchscreen.

5. The computer system of claim 3, further comprising a keypad.

6. A non-transitory computer-readable storage medium comprising computer executable instructions stored therein which, when executed, cause a processor of a handheld device to perform a method for entering blueprint data into said handheld device comprising:
   receiving in said handheld device a start point for a first line segment;
   receiving in said handheld device a length for said first line segment;
   receiving in said handheld device a direction for said first line segment, wherein an end point of said first line segment is determined from said start point, said direction, and length received for said first line segment;
   receiving in said handheld device a start point for an arc;
   receiving in said handheld device an end point for said arc;
   receiving in said handheld device a radius for said arc;

receiving and displaying said first line segment and said arc on a display associated with said handheld device;
automatically parsing said arc into a plurality of arc subdivisions with a line segment editor;
receiving in said handheld device a start point for a second line segment, wherein said start point of said second line segment is said end point of said first line segment wherein said end point of said second line segment is determined from said start point of said second line segment, and received direction and length for said second line segment;
receiving and displaying said second line segment on said display;
receiving in said handheld device a start point for a third line segment, wherein said start point of said third line segment is said end point of said second line segment;
translating in said handheld device said second line segment so that the start point of said second line segment coincides with an end point of said third line segment;
receiving and displaying said third line segment on said display;
storing said first, second, and third line segments as a hierarchical sequence within a memory of said handheld device; and
in response to deletion of said second line segment a processor of said handheld device automatically identically translates said third line segment in said memory without translating said first line segment such that coincidence is achieved between the start point of said third line segment and an endpoint of said first line segment.

* * * * *